Oct. 13, 1942. A. LYSHOLM Re. 22,201

GAS TURBINE PLANT

Original Filed May 12, 1938 3 Sheets-Sheet 1

INVENTOR
A. Lysholm
BY
Daniel C. Wattle
ATTORNEY

Oct. 13, 1942. A. LYSHOLM Re. 22,201

GAS TURBINE PLANT

Original Filed May 12, 1938 3 Sheets-Sheet 2

INVENTOR
BY
ATTORNEY

Oct. 13, 1942. A. LYSHOLM Re. 22,201

GAS TURBINE PLANT

Original Filed May 12, 1938 3 Sheets-Sheet 3

INVENTOR
A. Lysholm
BY
David C. Worth
ATTORNEY

Reissued Oct. 13, 1942

Re. 22,201

UNITED STATES PATENT OFFICE 22,201

GAS TURBINE PLANT

Alf Lysholm, Stockholm, Sweden, assignor, by mesne assignments, to Jarvis C. Marble, New York, N. Y., Leslie M. Merrill, Westfield, N. J., and Percy H. Batten, Racine, Wis., as trustees Original No. 2,238,905, dated April 22, 1941, Serial No. 207,457, May 12, 1938. Application for reissue April 21, 1942, Serial No. 439,956. In Great Britain May 14, 1937

21 Claims. (Cl. 60—41)

The present invention relates to gas turbine plants of the continuous combustion type comprising a plurality of turbines or turbine stages and a plurality of heating means for heating the motive fluid to be expanded in the turbines. In order to obtain a simple control of such gas turbine plants, it has proved suitable, in designing the gas turbine system, to make endeavours to have the different parts of the plant at variations in load adjust themselves automatically so that under normal conditions the change of the fuel supply to a single heating chamber or the like will be sufficient to adjust the useful power as well as the power required for the compression of the combustion air in accordance with varying operating conditions.

However, such simple control is not always possible. It is one of the objects of the invention to provide in plants in which a single control would not be sufficient, simple controlling means to be easily adapted to varying load conditions. Another object of the invention is to provide means whereby it will be possible to supply heat to the various heating means independently of one another. A further object of the invention is to avoid as far as possible the use of control valves for the supply of motive fluid to the turbines. Due to the large volumes of the motive fluid and the high temperatures of the same such control valves are very expensive and cause considerable losses of pressure.

For a better understanding of the nature of the present invention and the advantages to be derived from its use, reference is had to the accompanying drawings forming a part of this specification.

In gas turbine plants in which the motive fluid is heated by injection of fuel each individual combustion chamber may be provided with a separate fuel pump the fuel supplying characteristic of which is independent of that of the other fuel pumps or is individually adjustable. Assuming a plurality of such fuel pumps running at the same speed because of a common drive, said fuel pumps may, in accordance with the present invention, be varied separately and independently as to their fuel supplying characteristics, that is, any influence due to controlling movements should act on each pump in a different way so that the supply of fuel by one pump may be changed in a manner different from the change of the fuel supply of other pumps. By the provision of heat supplying devices having individual heat supplying characteristics it is possible accurately to adjust the supply of heat to the several heating devices and to have the several heat supplying devices respond in different ways to the action of the controlling member.

It is, for instance, possible to actuate such heat supplying devices, such as fuel pumps, by a common centrifugal governor, each individual pump responding, however, in different manner to the common controlling impulse. There is a further possibility of adjusting the characteristic of each heat supplying device in a manner such that all heat supplying devices or part of them will respond to the action of the control member throughout the whole range of load or only part thereof. The heat supplying devices may be in the form of fuel pumps, gas generators, heat exchangers and the like apparatus for imparting heat to the motive fluid.

Figure 1:
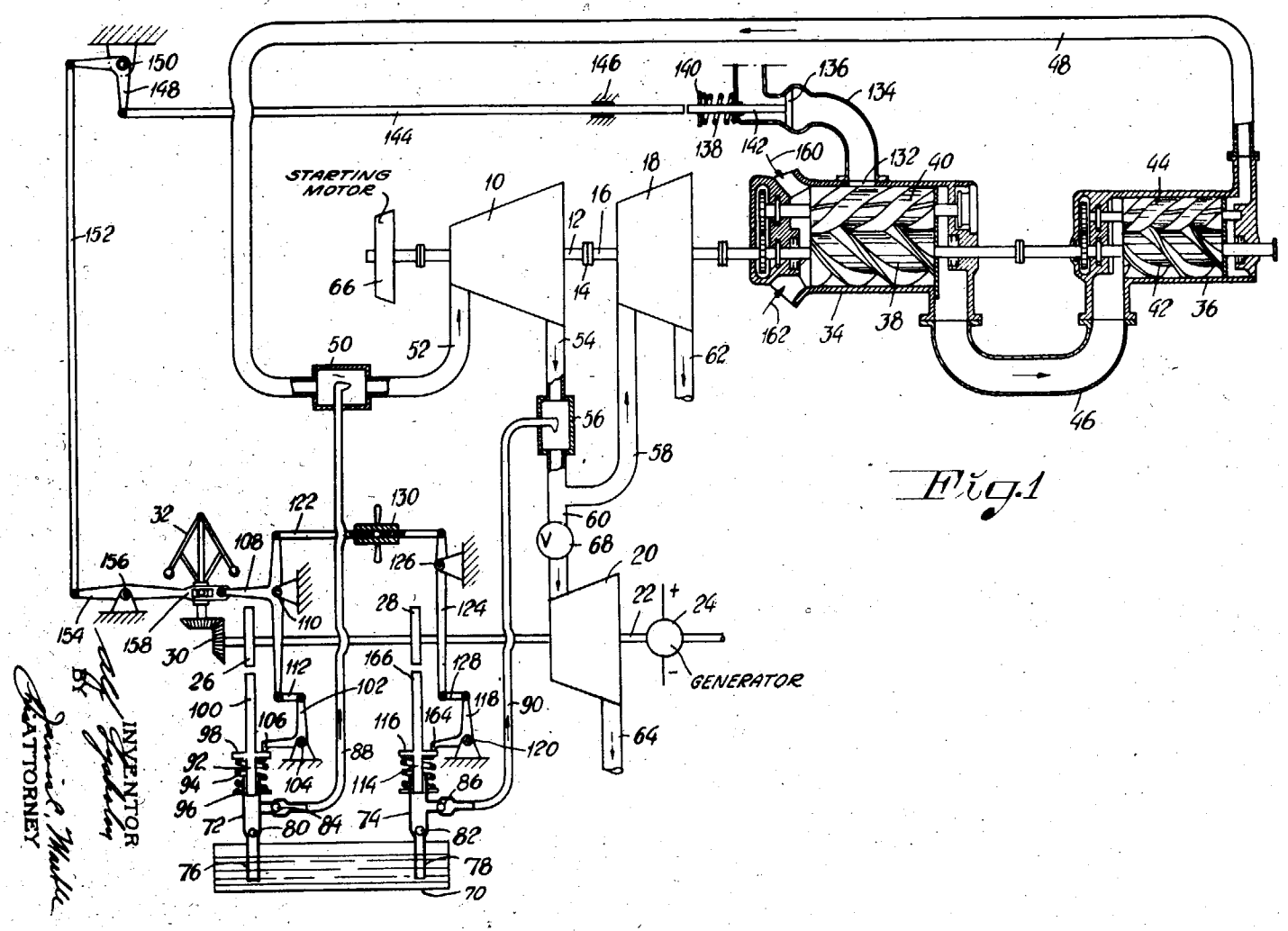
Fig. 1 shows more or less diagrammatically a gas turbine plant for driving an electrical generator, some of the parts of the plant being shown in section.

In the embodiment shown in Fig. 1, fuel pumps are used for supplying metered quantities of fuel to separate combustion chambers in which the fuel is burnt with air compressed in a compressor driven by part of the gas turbines. 10 designates a high pressure gas turbine mounted on a shaft 12 which by means of a coupling 14 is connected with the shaft 16 of a low pressure turbine 18. Another low pressure turbine 20 coupled in parallel with the turbine 18 is mounted on a shaft 22 which also carries an electrical generator 24, pump actuating cams 26 and 28, and a toothed gear 30 for driving a speed governor 32. Coupled to the shaft of the low pressure turbine 18 is an air compressor consisting of a low pressure compressor 34 and a high pressure compressor 36. The compressors are of the rotary screw type having a casing and rotors 38, 40 and 42, 44 respectively provided with intermeshing lobes cooperating within the casing to provide compression spaces of variable volume. The outlet of the low pressure compressor is connected to the inlet of the high pressure compressor by means of a conduit 46. A conduit 48 connects the discharge side of the high pressure compressor to a combustion chamber 50 which communicates with the inlet of the high pressure turbine 10 through a conduit 52. The exhaust conduit 54 of the high pressure turbine is connected to a second combustion chamber or reheating chamber 56 which through conduits 58 and 60 is in communication with the inlets of the low pressure turbines 18 and 20 respectively. The exhaust conduits of the last-named turbines are indicated at 62 and 64 respectively. 66 designates a motor of any suitable type for starting the gas turbine plant, said motor being connected to the shafts of the turbines 10 and 18. A shut-off valve 68 is inserted in the inlet conduit 60 of the low pressure turbine 20.

70 indicates a fuel tank from which fuel, such as oil, is supplied to the combustion chambers by means of two displacement pumps 72 and 74, diagrammatically indicated in the drawings and having suction pipes 76, 78, inlet valves 80, 82, outlet valves 84, 86, and discharge conduits 88, 90, respectively. The plunger 92 of the fuel pump 72 is adapted to be actuated by the rotating cam 26 against the action of a helical spring 94 resting against an annular member 96 secured to the casing of the pump and against an annular projection 98 integral with the plunger. While the lower position of the plunger 92 is determined by the cam 26 and the length of the portion 100 of the plunger cooperating with the said cam, said lower position being definitely determined by the construction of the said parts, the uppermost position of the plunger and, consequently, the stroke of the pump is determined by the position of a lever 102 pivoted at 104 and having an abutment 106 which rests against the upper surface of the projection 98 and thus limits the upward movement of the plunger. The position of the lever 102 is controlled by the governor 32 by means of a lever 108 pivoted at 110 and by means of a rod 112 linked to the levers 108 and 102, as clearly shown in the drawings. The construction of the displacement pump 74 is similar to that described with reference to the pump 72, the upper position of the plunger 114 of the pump 74 being limited by the cooperation with the projection 164 of a lever 118 pivoted at 120. The lever 118 is connected to the lever 108 by means of a rod 122, a lever 124 pivoted at 126 and a link 128. The length of the rod 122 is variable by means of a turnbuckle 130.

Between the inlet and the outlet of the low pressure compressor 34 the casing has an aperture 132 to which there is connected a conduit 134 normally closed by a valve 136 which is held against its seat under the action of a spring 138 resting against a disk 140 secured to the stem 142 of the valve. A rod 144 carried in a suitable bearing 146 is arranged in alignment with the stem 142 and is normally held at a short distance from the stem under the influence of the governor 32 to which the rod 144 is connected by a suitable linkage consisting of a lever 148 pivoted at 150, a link 152 and a lever 154 pivoted at 156 and connected to the sleeve 158 of the governor.

In operation, air is drawn into the low pressure compressor as indicated by the arrows 160 and 162. After having been compressed therein the air flows through the conduit 46 into the high pressure compressor 36 and is conducted after final compression through the conduit 48 into the combustion chamber 50 in which it is heated by the combustion of fuel supplied to the combustion chamber by the pump 72 and the fuel supply conduit 88. The heated motive fluid is admitted to the high pressure turbine 10 in which it produces power by decrease in pressure and temperature. The exhaust gases of the high pressure turbine are reheated in the reheating chamber 56 by admission thereto of fuel supplied by the fuel pump 74 and the conduit 90. The reheated motive fluid is then supplied through the conduits 58 and 60 to the low pressure turbines 18 and 20 respectively. As will be seen, the power produced by the turbines 10 and 18 is utilized for driving the compressors 34 and 36, whereas the output of the turbine 20 is imparted to the electrical generator 24.

At full load on the plant the sleeve 158 of the governor 32 is in its lowermost position and, consequently, the abutments 106 and 164 of the levers 102 and 118 respectively are in their uppermost positions so that the pumps will work with the greatest stroke of their plungers and will supply the maximum quantities of fuel to the combustion chambers 50 and 56 respectively. In the lowermost position of the governor sleeve 158 the rod 144 is in its left-hand end position in which the distance between the right-hand end of the rod and the valve stem 142 has its maximum value. The valve 136 is thus held in closed position under the influence of the spring 138.

If the load on the plant decreases, the governor sleeve 158 will move upwards, and this movement is transmitted by the linkages cooperating with the lever 108 to the levers 102 and 118 which will be turned in an anti-clockwise direction so that their abutments 106 and 164 will be moved downwards and thereby decrease the upward stroke of the plungers 92 and 114. As a consequence thereof, the pumps 72 and 74 will supply a decreased quantity of fuel corresponding to the decrease in load so that the speed of the useful power turbine 20 will be maintained substantially constant. Due to the diminished supply of fuel, the compressor turbines 10 and 18 will impart a correspondingly reduced output to the compressors so that the compressor aggregate together with the last-named turbines will rotate at a reduced speed and produce a decreased quantity of compressed air corresponding to the decrease in fuel and to the new load condition.

Upon the upward movement of the governor sleeve 158 the rod 144 will be moved towards the right. Thereby, the distance between the adjacent ends of the rod 144 and the valve stem 142 will be more or less reduced, but this distance will be still so great that the valve stem will not be actuated by the rod, and the valve 136 will thus be maintained in closed position.

As will be seen from the drawings, the leverage of the lever 108 with respect to its fulcrum 110 is different from the leverage of the lever 124, the arrangement being such that upon a certain upward movement of the governor sleeve 158 the downward movement of the lever abutment 164 will be greater than the downward movement of the lever abutment 106. From this it follows that the pumps, although they are influenced by a common governor, will be controlled independently of each other as to the quantity of fuel supplied by them. Thus, upon a certain increase of the speed of the useful power turbine 20 the decrease of the quantity of fuel supplied by the pump 74 will be greater than the decrease of the quantity of fuel supplied by the pump 72. It will be obvious that the ratio between the decreases of the fuel quantities supplied by the pumps can be altered to any desired rate by suitably adjusting the lengths of the parts of the linkage actuating the levers 102 and 118 or by varying the places of the fulcrums 110 and 126, or by varying the lengths of the connecting rod 122 by means of the turnbuckle 130.

Since the reduction of the stroke of the plunger 114 upon decrease in load is greater than the reduction of the stroke of the plunger 92, the projection 116 of the plunger 114 will be lowered at a certain low load to such an extent, that the plunger rod 166 will be moved downwards out of the path of the cam 28 so that the pump 74 will be entirely put out of operation. In this case, fuel is supplied to the high pressure combustion chamber 50 only, and no reheating of the motive fluid takes place in the low pressure combustion chamber 56. A customary pilot burner not illustrated in the drawings is preferably arranged in the chamber 56 so that a new combustion can be started therein immediately upon increase in load.

At low loads the rod 144 is moved so far to the right that it engages the valve stem 142 and opens the valve 136 with the result that a portion of the air drawn in by the low pressure compressor will be blown out through the bleeder pipe 134. Thereby the amount of compressed air will be reduced so as to correspond to the decreased amount of fuel. The position of the aperture 132 is preferably such that the air discharged through the conduit 134 has not been compressed to a considerable degree. Such control means and its operation is described in detail in my copending patent application, Serial No. 71,363, filed March 28, 1936.

For starting the aggregate, the valve 68 is closed and the starting motor 66 is put into operation. When the compressor aggregate is sufficiently speeded up to produce a certain quantity of compressed air, the valve 68 is opened and the turbine 20 will then be started by compressed air and operate the fuel pumps so as to supply fuel to the combustion chambers.

Figure 2:
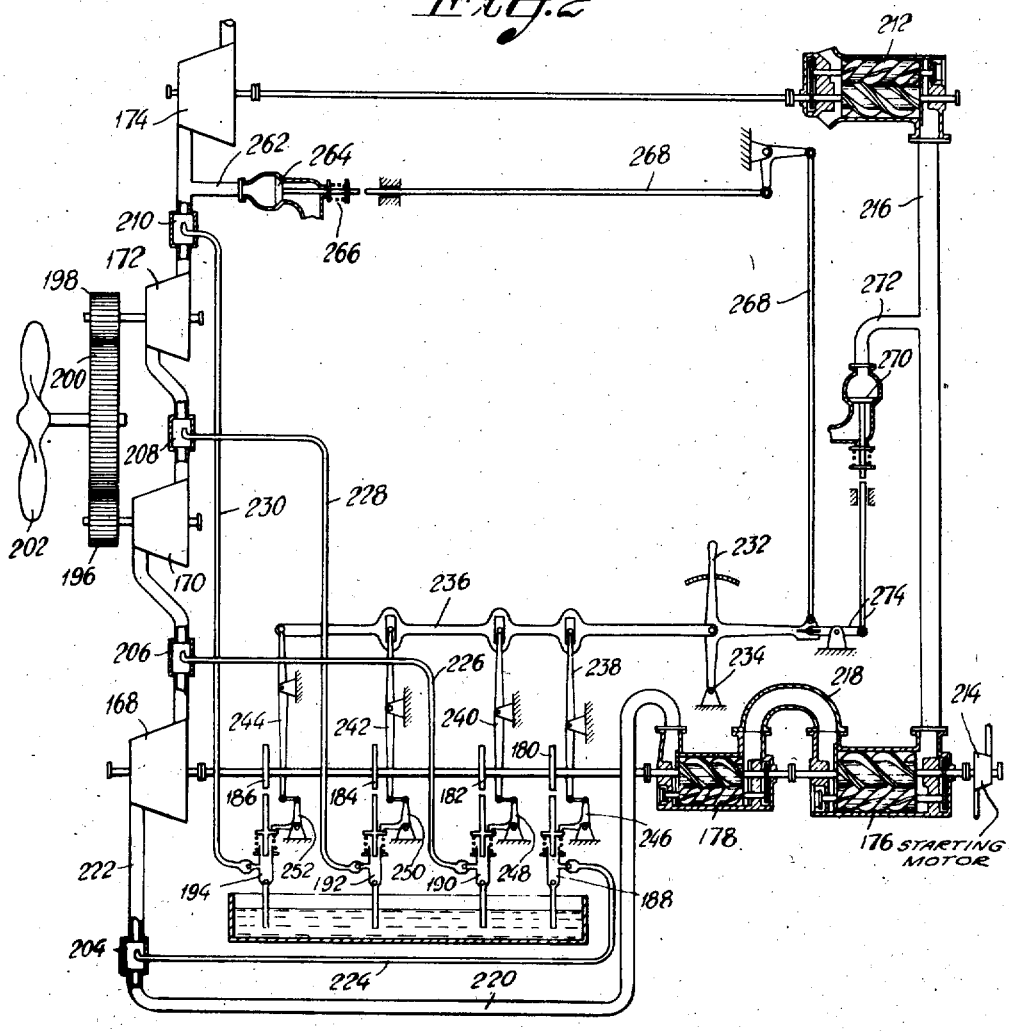
Fig. 2 is a gas turbine plant adapted for marine propulsion and comprising four gas turbines coupled in series, each of the turbines being provided with heating means for the motive fluid.

The embodiment of the invention illustrated in Fig. 2 comprises four turbines 168, 170, 172, and 174 coupled in series and operating on separate shafts. The high pressure turbine 168 drives an intermediate pressure compressor 176, a high pressure compressor 178 and four cams 180, 182, 184, and 186 for actuating four fuel pumps 188, 190, 192, and 194. The intermediate pressure turbines 170 and 172 drive, by means of a suitable gearing 196, 198, 200, the propeller 202 of a vessel. Each turbine is provided with a heating chamber 204, 206, 208, and 210, respectively. The low pressure turbine 174 drives a low pressure compressor 212. 214 indicates a starting motor adapted to start up the compressors 176 and 178.

The air compressed in the low pressure compressor is supplied to the intermediate pressure compressor by means of a conduit 216. 218 is a conduit for supplying air compressed in the intermediate pressure compressor to the inlet of the high pressure compressor. The finally compressed air passes through a conduit 220 to the high pressure combustion chamber 204 and thence through the conduit 222 to the inlet of the high pressure turbine 168. The fuel pumps are constructed and operate in the same manner as described with reference to the fuel pumps 72 and 74 in the embodiment shown in Fig. 1. They are connected to the respective combustion chambers by means of the fuel supply conduits 224, 226, 228, and 230.

Control of the plant described is effected manually by means of a controlling device diagrammatically indicated by a control lever 232 which is pivoted at 234 and which acts upon the four fuel pumps by means of a link 236 engaging four levers 238, 240, 242, and 244. These levers are linked to levers 246, 248, 250, and 252, respectively, which are provided with abutting surfaces adapted to engage the respective plungers of the fuel pumps in the manner described with reference to the pumps shown in Fig. 1. The levers 238—244 have different leverages such that upon displacement of the link 236 the turning movement of the lever 252 will be greater than that of the lever 250 and still greater than that of the lever 248, the movement of which will be greater than that of the lever 246.

Figure 3:
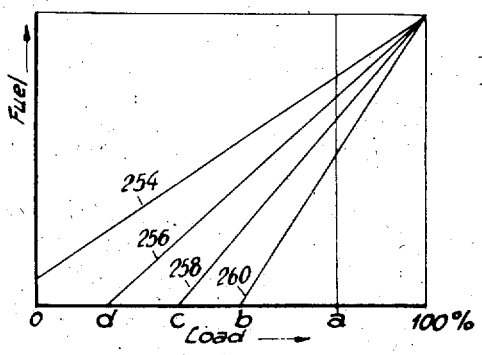
Fig. 3 is a diagram illustrating the operation of the fuel pumps of the gas turbine plant shown in Fig. 2.

The quantities of fuel supplied by the different pumps are illustrated in the diagram shown in Fig. 3, in which the abscissae indicate the load on the plant in per cent and the ordinates represent amounts of fuel supplied by the pumps. The lines 254, 256, 258, and 260 represent the amounts of fuel supplied by the pumps 188, 190, 192, and 194, respectively. At full load, all of the pumps are supplying their maximum quantity of fuel. At a partial load *a* the fuel quantities will be produced, the reduction being greatest for the pump 194 which supplies fuel to the combustion chamber 210 operating at the lowest pressure. At a load indicated at *b* the pump 194 is entirely put out of operation. Upon further decrease of the load down to *c* also the pump 192 comes to a rest. Between no load and the load *d*, only the pump 188 is in operation.

The low pressure turbine 174 is in operation at high loads only. In order to put this turbine out of operation, there is provided a by-pass conduit 262 between the combustion chamber 210 and the turbine 174. The by-pass conduit has a valve 264 which at high loads is maintained closed under the action of a spring 266. The valve 264 can be opened by means of a link system 268 which can be actuated by the control lever 232. The left-hand end position of the control lever corresponds to full load. As the lever is moved towards the right the output of the plant is gradually reduced, and the right-hand end position of the lever corresponds to no load. Upon opening of the valve 264 the motive fluid exhausted from the turbine 172 will be discharged through the conduit 262 so that the low pressure turbine 174 will come to a rest. In order to simultaneously put the low pressure compressor 212 out of operation, a valve 270 provided in a branch conduit 272 is opened by a suitable linkage 274 actuated by the control lever 232 so that air will directly pass from the atmosphere through the conduits 272 and 216 to the intermediate pressure compressor 176.

Figure 4:
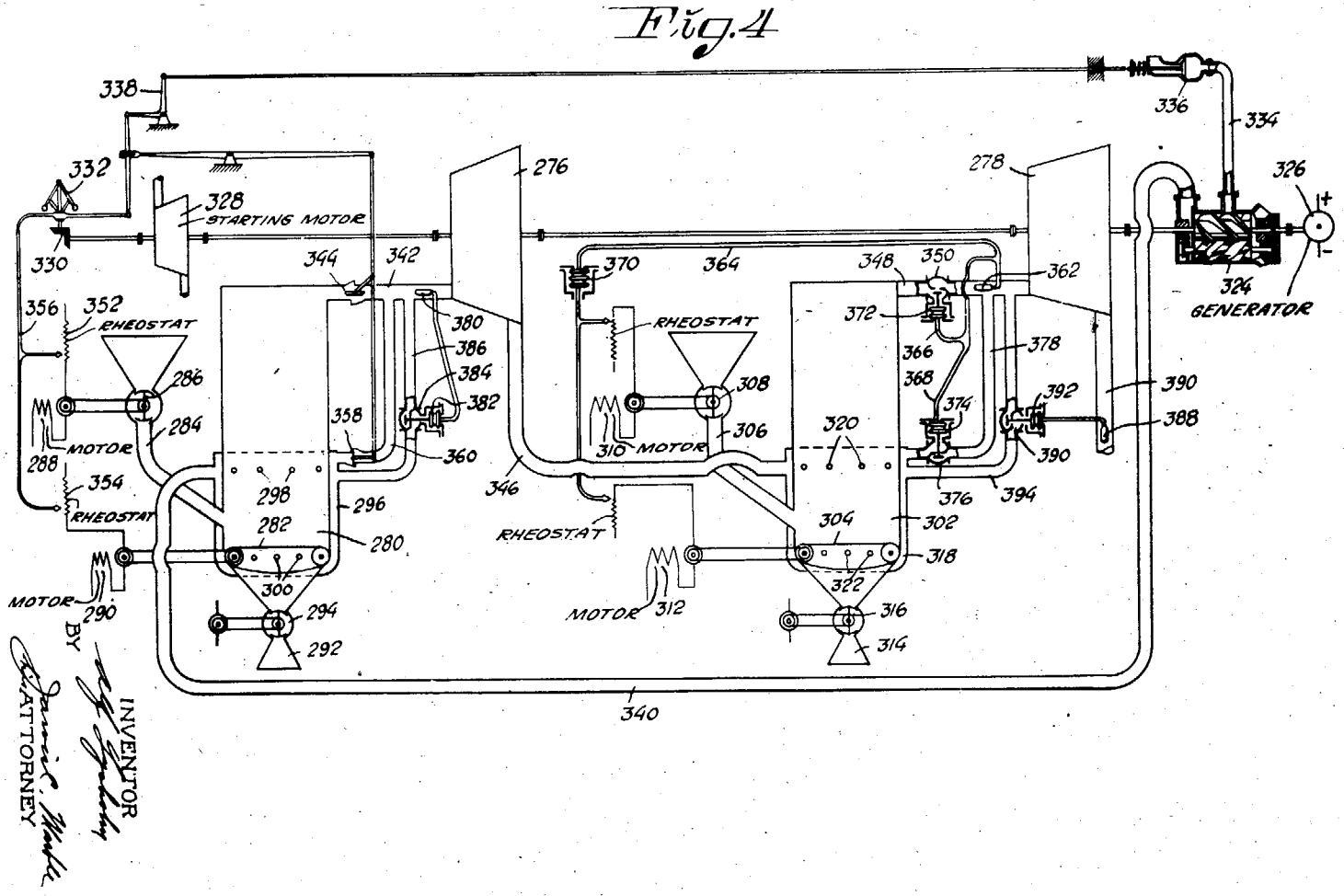
Fig. 4 shows a gas turbine plant in which gas is produced in gas generators associated with the turbine plant.

The gas turbine plant illustrated in Fig. 4 comprises two gas generators, one generator being provided for the high pressure turbine 276 and the other one for the low pressure turbine 278.

The gas generator for the high pressure turbine comprises a combustion chamber 280 in which fuel is burnt on a stoker 282. Fuel is supplied to the stoker by means of a supply conduit 284 provided with a rotatable sluice valve 286 operated by an electric motor diagrammatically indicated at 288. 290 designates an electric motor for driving the stoker 282. Below the stoker there is provided an ash chute 292 having a rotatable sluice valve 294. The lower portion of the combustion chamber is surrounded by a hollow space 296 which through openings 298 and 300 communicates with the combustion chamber. The corresponding parts of the gas generator for the low pressure turbine comprise a combustion chamber 302 in which fuel is burned on a stoker 304. Fuel is supplied to the stoker by means of a supply conduit 306 provided with a rotatable sluice valve 308 operated by an electric motor 310. A motor 312 drives the stoker 304. An ash chute 314 is provided below the stoker and has a rotatable sluice valve 316. The lower portion of the combustion chamber is surrounded by a hollow space 318 which, through openings 320 and 322, communicates with the combustion chamber. 324 indicates an air compressor, 326 an electric generator, 328 a starting motor, and 330 a gearing for driving a centrifugal governor 332. The compressor 324 is provided with a bleeder pipe 334 having a valve 336 operable by the governor 332 by means of a suitable linkage 338 in substantially the same manner as described with reference to the valve 136 shown in Fig. 1, with the exception that in the present embodiment the valve 336 will be opened already at a little decrease of the load below full load. This is necessary for the following reasons. In the present embodiment, the air compressor is directly connected to the electrical generator 326 which is assumed to be driven at substantially constant speed. Without control of the compressor by means of the valve 336 the air quantity supplied to the gas generators would be constant at all loads. This would result in a considerable decrease of temperature of the motive fluid at low loads so that the plant would operate at very poor partial load efficiencies.

Air compressed in the compressor 324 passes through the conduit 340 into the hollow space 296 surrounding the combustion chamber 280 and therefrom partly through the openings 300 to the zone of combustion and partly through the openings 298 to the combustion chamber where it serves as secondary combustion air. The motive fluid produced in the gas generator is supplied through a conduit 342 provided with a control valve 344 to the high pressure turbine 276 and thence through the conduit 346 to the gas generator of the low pressure turbine, in which the excess of air contained in the exhaust gases is utilized for burning the fuel supplied to the low pressure gas generator. The motive fluid produced therein passes through a conduit 348 provided with a valve 350 to the low pressure turbine 278.

Control of the high pressure gas generator is effected in such a manner that the governor 332 in addition to the bleeder valve 336 controls the speed of the motor 288 actuating the fuel supply valve 286 and the speed of the motor 290 which drives the stoker 282, this regulation being effected by varying resistances 352 and 354 by means of a control member 356 diagrammatically indicated in the drawings. Upon decrease in load the speeds of the motors 288 and 290 are reduced so that the supply of fuel and the velocity of the stoker will be decreased. The governor further acts upon the valve 344 and upon a valve 358 arranged in a by-pass conduit 360. The last-named valves are mechanically interconnected to each other in such manner that at full load the valve 344 is entirely opened and the valve 358 is closed. Upon decrease in load the valve 344 reduces the cross-sectional area, whereas the valve 358 is opened to a corresponding degree with the result that a portion of the compressed air can pass from the hollow space 296 directly to the high pressure turbine without taking part in the combustion.

Control of the low pressure gas generator is effected in substantially the same manner as the control of the high pressure gas generator. However, instead of the load governor a thermostat 362 provided in the inlet conduit 348 of the low pressure turbine is used as an impulse for the control. By means of conduits 364, 366 and 368, the thermostat 362 acts on suitable bellows diagrammatically indicated at 370, 372 and 374 in such a way that upon increase of the temperature in the inlet conduit 348 the speed of the motors 310 and 312 will be reduced, the valve 350 will be more or less closed, and the valve 376 arranged in a by-pass conduit 378 will be opened correspondingly.

In the present embodiment there are provided, in addition to the normal control means, two safety controlling devices constructed in the form of thermostats. The one of these controlling devices has for its purpose to prevent undue rise of the temperature of the motive fluid in the inlet conduit 342 of the high pressure turbine and is in the form of a thermostat 380 wihch at a certain maximum temperature by means of a bellows 382 opens a valve 384 disposed in a second by-pass conduit 386 and thereby causes the motive fluid to be cooled by air passing directly from the space 296 surrounding the combustion chamber. The other safety control device consists of a thermostat 388 located in the exhaust pipe 390 of the low pressure turbine and adapted upon rise of the temperature in the exhaust pipe to a certain maximum value to open a valve 390 by means of a bellows 392. The valve 390 is located in a by-pass conduit 394 through which motive fluid not heated in the combustion chamber 302 can flow to the inlet of the low pressure turbine and thereby cool the heated motive fluid supplied through the conduit 348.

From the foregoing description, it will be evident that many specific different arrangements may be employed within the scope of the invention, and it is to be understood that the invention includes all that falls within the scope of the appended claims.

What I claim is:

1. In a gas turbine plant of the continuous combustion type, a plurality of turbines, compressor means driven by at least one of said turbines and arranged to produce a variable quantity of motive fluid, a plurality of independent heating means arranged at least before part of said turbines, means for supplying motive fluid from said compressor means to said heating means and to said turbines, and a plurality of independent positively metering heat supply means for supplying independent variable quantities of heat to the several heating means.

2. In a gas turbine plant of the continuous combustion type, a plurality of turbines, compressor means driven by at least one of said turbines and arranged to produce a quantity of motive fluid variable in response to variations in the load on the plant, a plurality of independent heating means arranged at least before part of said turbines, means for supplying motive fluid from said compressor means to said heating means and to said turbines, a plurality of indepedent positively metering heat supply means for supplying fuel to the several heating means, and controlling means for independently controlling said heat supply means.

3. In a gas turbine plant of the continuous combustion type, a plurality of turbines, compressor means driven by at least one of said turbines and arranged to produce a quantity of motive fluid variable in response to variations in the load on the plant, a plurality of independent heating means arranged at least before part of said turbines, means for supplying motive fluid from said compressor means to said heating means and to said turbines, a plurality of independent positively metering heat supply means for supplying fuel to the several heating means, and controlling means responsive to the load on the plant for independently controlling said heat supply means.

4. In a gas turbine plant of the continuous combustion type, a plurality of turbines, compressor means driven by at least one of said turbines and arranged to produce a quantity of motive fluid variable in response to variations in the load on the plant, a plurality of independent heating means arranged at least before part of said turbines, means for supplying motive fluid from said compressor means to said heating means and to said turbines, a plurality of independent positively metering heat supply means for supplying fuel to the several heating means, controlling means responsive to the load on the plant for controlling part of said heat supply means, and controlling means responsive to the temperature of the heated motive fluid for controlling the other part of said heat supplying means.

5. In a gas turbine plant of the continuous combustion type, a plurality of turbines, compressor means driven by at least one of said turbines and arranged to produce a quantity of motive fluid variable in response to variations in the load on the plant, a plurality of independent heating means arranged at least before part of said turbines, means for supplying motive fluid from said compressor means to said heating means and to said turbines, a plurality of independent positively metering heat supply means for supplying fuel to the several heating means, and controlling means responsive to the load on the plant for independently controlling said heat supply means and for decreasing the quantity of compressed motive fluid at a decrease in load.

6. In a gas turbine plant of the continuous combustion type, a plurality of turbines coupled in series, compressor means driven by at least one of said turbines and arranged to produce a quantity of motive fluid variable in response to variations in the load on the plant, a plurality of independent heating means arranged at least before part of said turbines, means for supplying motive fluid from said compressor means to said heating means and to said turbines, a plurality of independent positively metering heat supply means for supplying fuel to the several heating means, controlling means responsive to the load on the plant for controlling the first heat supply means in the series, and controlling means responsive to the temperature of the heated motive fluid for controlling the last heat supply means in the series.

7. In a gas turbine plant of the continuous combustion type, a plurality of turbines, at least one compressor driven by at least one of said turbines and arranged to produce a variable quantity of motive fluid, a plurality of combustion chambers arranged at least before a part of said turbines, means for supplying motive fluid from said combustion chambers to said turbines, plunger pump means for supplying separate positive metered quantities of fuel to the several combustion chambers and governing means for varying in predetermined relation the amounts of the separately metered quantities of fuel supplied to different combustion chambers.

8. In a gas turbine plant of the continuous combustion type, a plurality of turbines, at least one compressor driven by at least one of said turbines and arranged to produce a variable quantity of motive fluid, a plurality of combustion chambers arranged at least before part of said turbines, means for supplying motive fluid from said compressor to said combustion chambers and to said turbines, a plurality of independent positively metering fuel pumps for supplying fuel to the several combustion chambers, and controlling means responsive to the load on the plant for independently controlling the amount of fuel supplied by said pumps.

9. In a gas turbine plant of the continuous combustion type, a plurality of turbines, at least one compressor driven by at least one of said turbines and arranged to produce a variable quantity of motive fluid, a plurality of combustion chambers arranged at least before part of said turbines, means for supplying motive fluid from said compressor to said combustion chambers and to said turbines, a plurality of independent positively metering fuel pumps for supplying fuel to the several combustion chambers, and governing means responsive to the variations in load on the plant for positively varying the effective delivery stroke of each of said pumps by a separate predetermined amount for each pump.

10. In a gas turbine plant of the continuous combustion type, a plurality of turbines coupled in series, at least one compressor driven by at least one of said turbines and arranged to produce a variable quantity of motive fluid, a plurality of combustion chambers arranged at least before part of said turbines, means for supplying motive fluid from said compressor to said combustion chambers and to said turbines, a plurality of independent positively metering fuel pumps for supplying fuel to the several combustion chambers, and controlling means responsive to the load on the plant for varying the stroke of said pumps such that upon decrease in load the stroke of a pump supplying fuel to a low pressure combustion chamber is decreased more than the stroke of a pump supplying fuel to a high pressure combustion chamber.

11. In a gas turbine plant of the continuous combustion type, a plurality of turbines, at least one compressor driven by at least one of said turbines and arranged to produce a variable quantity of motive fluid, a plurality of combustion chambers arranged at least before part of said turbines, means for supplying motive fluid from said compressor to said combustion chambers and to said turbines, a plurality of independent positively metering fuel pumps for supplying fuel to the several combustion chambers, governing means responsive to the variations in load on the plant for positively varying the effective delivery stroke of each of said pumps by a saparate predetermined amount for each pump, and means for changing the relationship of the amount of variation of the effective delivery strokes of the different pumps for a given variation of load on the plant.

12. In a gas turbine plant of the continuous combustion type, a plurality of turbines, at least one compressor driven by at least one of said turbines and arranged to produce a variable quantity of motive fluid, a plurality of combustion chambers arranged at least before part of said turbines, means for supplying motive fluid from said compressor to said combustion chambers and to said turbines, a plurality of independent positively metering fuel pumps for supplying fuel to the several combustion chambers, and governing means responsive to variations in load on the plant for varying the quantity of motive fluid supplied by said compressor and for positively varying the effective delivery stroke of each of said pumps by a separate predetermined amount for each pump.

13. In a gas turbine plant of the continuous combustion type, a plurality of turbines coupled in series, at least one compressor driven by at least one of said turbines and arranged to produce a variable quantity of motive fluid, a plurality of combustion chambers arranged at least before part of said turbines, means for supplying motive fluid from said compressor to said combustion chambers and to said turbines, a plurality of independent positively metering fuel pumps for supplying fuel to the several combustion chambers, and governing means responsive to variations in the load on the plant for cutting out of the series at least one of said turbines and for varying by a separate predetermined amount the quantity of positively metered fuel delivered by different ones of said fuel pumps.

14. In a gas turbine plant of the continuous combustion type for marine propulsion, a plurality of turbines, at least one compressor driven by at least one of said turbines and arranged to produce a variable quantity of motive fluid, a plurality of combustion chambers arranged at least before part of said turbines, means for supplying motive fluid from said compressor to said combustion chambers and to said turbines, a plurality of independent positively metering fuel pumps for supplying fuel to the several combustion chambers, and manually operable controlling means for independently varying the amount of fuel supplied by said pumps.

15. In a gas turbine plant of the continuous combustion type, a plurality of turbines, compressor means driven by at least one of said turbines and arranged to produce a quantity of motive fluid variable in response to variations in the load on the plant, a plurality of independent heating means arranged at least before part of said turbines, means for supplying motive fluid from said compressor means to said heating means and to said turbines, a plurality of independent positively metering heat supply means for supplying fuel to the several heating means, controlling means responsive to the load on the plant for independently controlling said heat supply means, and means responsive to the inlet temperature of at least one of said turbines for controlling the temperature of the motive fluid supplied thereto.

16. In a gas turbine plant of the continuous combustion type, a plurality of turbines, compressor means driven by at least one of said turbines and arranged to produce a quantity of motive fluid variable in response to variations in the load on the plant, a plurality of independent heating means arranged at least before part of said turbines, means for supplying motive fluid from said compressor means to said heating means and to said turbines, a plurality of independent positively metering heat supply means for supplying fuel to the several heating means, controlling means responsive to the load on the plant for independently controlling said heat supply means, and means responsive to the outlet temperature of at least one of said turbines for controlling the temperature of the motive fluid supplied thereto.

17. In a gas turbine plant of the continuous combustion type, at least one useful power turbine, at least one compressor turbine independent of the useful power turbine with respect to speed of operation, at least one compressor driven by said compressor turbine and arranged to produce a variable quantity of motive fluid, means for maintaining substantially constant the speed of said useful power turbine including a governor, a plurality of independent heating means arranged at least before part of said turbines, means for supplying motive fluid from said compressor to said heating means and to said turbines, and a plurality of independent positively metering heat supply means for supplying independent variable quantities of heat to the several heating means.

18. In a gas turbine plant of the continuous combustion type, a plurality of turbines, compressor means driven by at least one of said turbines and arranged to produce a quantity of motive fluid variable in response to variations in the load on the plant, a plurality of independent heating means arranged at least before part of said turbines, means for supplying motive fluid from said compressor means to said heating means and to said turbines, a plurality of independent positively metering heat supply means for supplying fuel to the several heating means, means responsive to the load on the plant for independently controlling said heat supply means, and means for varying the capacity of said compressor means while maintaining substantially constant speed of operation thereof.

19. In a gas turbine plant of the continuous combustion type, a plurality of turbines, at least one compressor driven by at least one of said turbines and arranged to produce a variable quantity of compressed air, a plurality of gas generators arranged at least before part of said turbines, means for supplying compressed air from said compressor to said gas generators for producing motive fluid therein, means for supplying motive fluid from said gas generators to said turbines, a plurality of independent positively metering fuel supply means for supplying fuel to the several gas producers, and controlling means responsive to the load on the plant for independently controlling the rate of combustion in one of said gas generators.

20. In a gas turbine plant of the continuous combustion type, a plurality of turbines, at least one compressor driven by at least one of said turbines and arranged to produce a variable quantity of compressed air, a plurality of gas generators arranged at least before part of said turbines, means for supplying compressed air from said compressor to said gas generators for producing motive fluid therein, means for supplying motive fluid from said gas generators to said turbines, a plurality of independent positively metering fuel supply means for supplying fuel to the several gas producers, and controlling means responsive to the temperature of said motive fluid for independently controlling the rate of combustion in one of said gas generators.

21. In a gas turbine plant of the continuous combustion type, a plurality of turbines, at least one compressor driven by at least one of said turbines and arranged to produce a variable quantity of compressed air, a plurality of gas generators arranged at least before part of said turbines, means for supplying compressed air from said compressor to said gas generators for producing motive fluid therein, means for supplying motive fluid from said gas generators to said turbines, a plurality of independent positively metering fuel supply means for supplying fuel to the several gas producers, and means for independently controlling the quantity of fuel supplied to said gas generators, and the quantity of air supplied to said gas generators.

ALF LYSHOLM.